Dec. 22, 1964     E. L. PETERS     3,162,051
TEMPERATURE SHIELD FOR HYDROBAROPHONE
Filed March 20, 1963
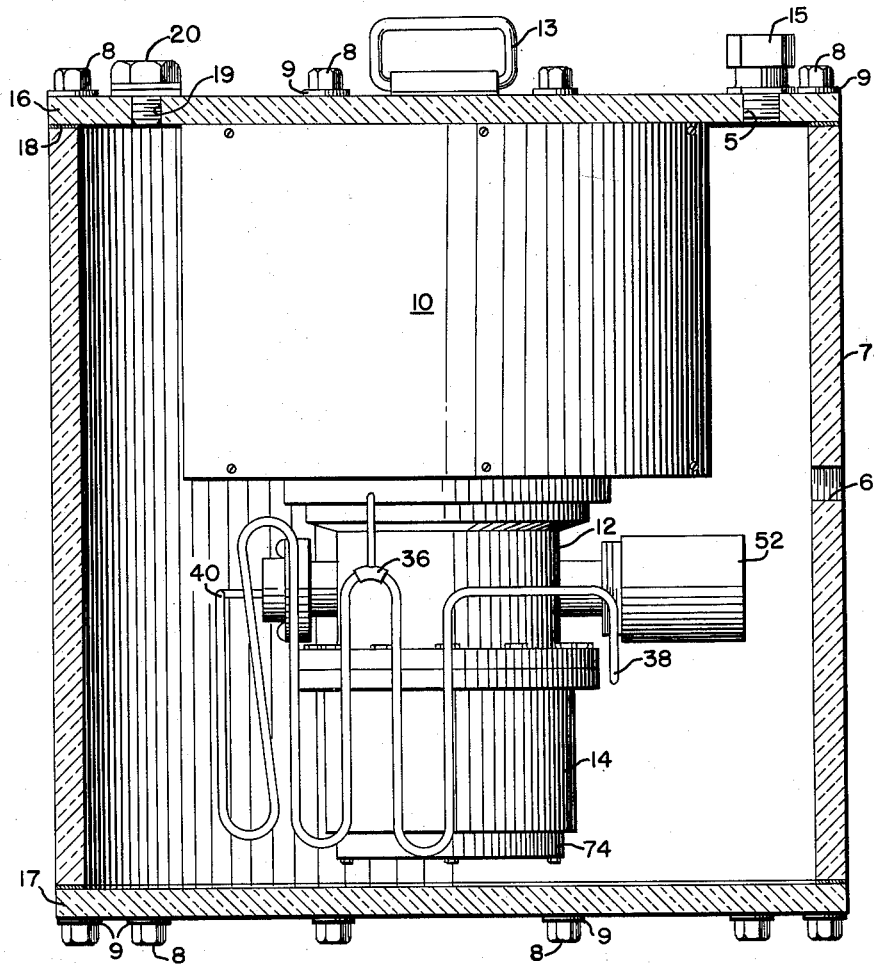
INVENTOR.
EDWARD L. PETERS
BY *[signature]*
ATTORNEY United States Patent Office 3,162,051
Patented Dec. 22, 1964

3,162,051
TEMPERATURE SHIELD FOR HYDRO-
BAROPHONE
Edward L. Peters, University Park, Md., assignor to the United States of America as represented by the Secretary of the Navy
Filed Mar. 20, 1963, Ser. No. 266,762
7 Claims. (Cl. 73—431)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a hydrobarophone and a novel reinforced plastic shield therefor and more specifically to a glass fiber reinforced plastic laminate shield encasing the hydrobarophone to enhance its underwater operation.

In the field of underwater pressure sensing devices, it has been the general practice to disregard entirely any form of exterior shielding means or to provide a metal shield to protect the pressure sensing device from damage during planting operations. The incremental hydrobarophone, the underwater pressure sensing device of the present invention is disclosed in Patent No. 3,000,216, issued to E. L. Peters et al. and assigned to the assignee of the present invention. The hydrobarophone disclosed in the above patent was designed to measure changes in water pressure in a straightforward fashion. When the hydrobarophone is submerged in sea water, usually by launching from a ship, the interior air pressure of the hydrobarophone is equal to the ambient outside hydrostatic pressure. A rapid change in pressure, exterior to the hydrobarophone, causes a deflection of the pressure sensitive diaphragm therein. An inductance coil is located adjacent the diaphragm and a Permalloy slug carried by the diaphragm is moved in relation to the coil to produce a change in coil inductance. In normal operation the hydrobarophone is lowered to the sea bottom and connected to a bridge by underwater electric cables and the bridge is then balanced. Further bridge unbalance is then a measure of the large or minute variations in sea water pressure. It has been found however that the hydrobarophone is not only sensitive to tides and pressure steps, but also responds to changing water temperatures. Such temperature response is undesirable due to the extreme difficulty in distinguishing between temperature and pressure changes exterior to the hydrobarophone, for example, the water temperature changes may be in the order of 1° F. to 2° F. over a period of 15 to 20 minute duration. Temperature changes of this order have been recorded by a thermister mounted near the hydrobarophone and by divers actually reading a thermometer on the sea bottom at the actual hydrobarophone location. The effect of such temperature changes have been shown by laboratory test experiments which show that temperature variations of this magnitude may cause the hydrobarophone to drift off scale. These changes are caused by the movement of masses of water shifting with tides or current within large masses of water. These temperature changes cause the diaphragm within the hydrobarophone to expand or contract. Such expansion or contraction changes the gap spacing within the diaphragm and unbalances the bridge circuit in the same fashion as would a pressure step. Having established that these temperature changes do occur and that the hydrobarophone does respond to such changes, it then becomes a matter of practical necessity to provide a means of shielding the hydrobarophone not only from damage during planting operations occasioned when the hydrobarophone is launched over the side of a ship, but also against these temperature changes which would occur adjacent to the exterior of an unshielded hydrobarophone.

The general purpose of the present invention is to provide such a dual purpose shield for reasons aforementioned which will protect the hydrobarophone during launching operations as well as insulate against temperature changes after the hydrobarophone is submerged.

An object of the present invention is to provide a glass fiber shield of glass fabric reinforced plastic laminate which is light in weight and possesses physical properties that will protect a hydrobarophone against temperature changes when mounted therein.

Another object is to provide in combination with a hydrobarophone a glass fiber reinforced shield which remains substantially uneffected by indefinite underwater use.

A further object is to provide a glass fiber reinforced shield for a hydrobarophone which has a low thermal conductivity, a good shock and environmental resistance and which is substantially impervious to water.

Still another object of the invention is to provide a glass fiber reinforced shield for a hydrobarophone which has a low thermal coefficient of expansion and which under operating conditions provides for a heat sink to aid in maintaining the hydrobarophone at a substantially constant temperature during measurements of pressure variation.

The exact nature of this invention as well as other objects and advantages thereof will be readily apparent from consideration of the following specification relating to the annexed drawing in which the single embodiment illustrates an elevation of the apparatus partly in section.

Referring now to the drawing, the hydrobarophone has its upper casing 10 attached to the lid 16 of the glass fiber reinforced shield and the hydrobarophone is disposed within the cylindrical glass fiber reinforced casing 7. The hydrobarophone further includes a middle casing 12 and a lower casing 14 which are assembled with the upper casing 10 by bolts and gaskets or O-rings so as to have water and airtight connections. An opening in the casing 12 connects the interior of an inflatable water proof bag, mounted within upper casing 10, through the tubing connector 36 to the tubes 38 and 40. A diaphragm 74 is bolted to the lower casing 14 and sealed to the lower casing by an O-ring seal. When there is a difference of pressure on the interior and exterior faces of the diaphragm 74, the diaphragm is deflected thereby moving the Permalloy slug attached thereto relative to an inductance coil. Such movement will vary the inductance of the coil and such variation or change may be measured on a wein bridge. A more detailed description of the operation of the hydrobarophone used herein will be found in the referenced E. L. Peters et al. Patent No. 3,000,216. The lid 16 and glass fiber reinforced bottom 17 may be bolted to the cylindrical casing 7 with bolts 8 and washers 9 around the outer periphery of the lid 16 and base 17. The cylindrical casing 7 has a hole 6 therein to enable the hydrobarophone mounted within the shield to be continuously subjected to the water pressure outside the shield. A lucite flute may or may not be used and mounted within hole 6 to deter sea life from entering the shield. The lid 16 has an opening 5 and cap 15 to form a shore cable port for receiving electrical cables interconnecting the hydrobarophone. The lid also has a hole 19 and plug 20 for the purpose of filling the shield with water before launching to reduce the buoyancy of the shielded hydrobarophone in the water. Both the case 17 and the lid 16 are sealed to the cylindrical casing 7 by gaskets 18 mounted at both ends of the cylindrical casing 7.

The glass fiber plastic reinforced laminate material used for shielding the hydrobarophone in one of the examples constructed was a glass fabric reinforced plastic laminate treated with an epoxy or polyester resin and having a thermal expansion coefficient of $1.49 \times 10^{-5}$ in./in./° C., a thermal conductivity approximately 2.5 B.t.u./hr./ft.$^2$/° F./in., and a water absorption of .17% weight increase/24 hrs. at 65° F. and 500 p.s.i. The wall thickness of the cylindrical casing and the bottom and top lids are approximately ¾ inch.

The functioning of the shielded system was tested by simulating in laboratory the maximum temperature changes to which the system would be subjected. This test consisted of submerging the shielded hydrobarophone in a water storage tank having various steam carrying coils therein for establishing a temperature differential in the water within the glass fabric reinforced plastic laminate shield, and the water outside the shield when immersed in the storage tank. A first and second thermocouple, were placed respectively within the shield adjacent to the diaphragm 74 and adjacent to the upper portion of the upper casing 10. A third and fourth thermocouple were then placed outside the glass fiber reinforced shield in close proximity to the first and second thermocouples within the shield. By using three steam carrying tank coils spaced vertically along the hydrobarophone, exterior to the shield, a uniform method of heat transfer to the water surrounding the shield was produced and electric stirring paddles were mounted at the top of the storage tank to stir the water to reduce any temperature gradient between thermocouple positions exterior to the shield. A resultant average of the six tests for various readings of degrees Fahrenheit taken at 10 minute intervals at each of the four thermocouples are shown in Chart I below.

CHART I

*Average of Six (6) Tests*

| Test No. | Thermocouple #1 Inside Shield Adjacent Diaphragm, Degrees F. | Thermocouple #2 Inside Shield Adjacent Upper Casing, Degrees F. | Thermocouple #3 Outside Shield Adjacent Diaphragm, Degrees F. | Thermocouple #4 Outside Shield Adjacent Upper Casing, Degrees F. |
|---|---|---|---|---|
| 7 | .1 | 1.5 | 16.5 | 21.0 |
| 8 | .2 | 1.9 | 17.6 | 21.9 |
| 9 | .1 | 1.4 | 15.3 | 21.0 |
| 10 | .1 | 1.4 | 17.2 | 21.6 |
| 11 | .1 | 2.0 | 13.8 | 19.0 |
| 12 | .3 | 2.6 | 18.4 | 22.9 |
| Average | +.15 | +1.8 | +16.4 | +21.2 |

The diaphragm 74, which is the critical area of the hydrobarophone, saw a temperature change of only .15° F. over a period of 60 minutes, but the outside area of the shield saw a 21.2° F. change over the same period of time. The magnitude of these outside temperatures is greater than any observed thus far in the field and the gain setting used on the bridge circuit during these series of tests is several times higher than any utilized in the field.

The volume of the casing 7 and the size of hole 6 will depend upon the degree of temperature stability required within the shield for a given ambient temperature change. For the temperature variations in the above laboratory tests, a shielding capacity of one and a half to two times that of the hydrobarophone provided a heat sink within the shield of sufficient volume to maintain the temperature stability exhibited in Chart I.

The minimum diameter of hole 6 is limited by that necessary to maintain an opening in the event small particles of sea life form around the periphery thereof. This is due to the low frequency range of pressure variations recorded by the hydrobarophone of the present invention. However, where substantially higher frequencies are to be recorded, a very small hole would provide varying delay times for different frequency of the changes in pressure signals transmitted to the hydrobarophone, and thereby render the minimum diameter of hole 6 a necessary consideration in determining the pressure frequency response of the hydrobarophone.

The maximum diameter of hole 6 is limited only by the allowable heat transfer therethrough. The diameter of hole 6 chosen for the above tests was ¾ inch.

It can be clearly seen above that the light weight glass fiber reinforced shield used with the hydrobarophone is particularly adapted to enhance its operation by not only protecting against damage to the hydrobarophone during planting operations by the proven qualities in physical strength of the material, but also in serving as a temperature shield by exhibiting optimum insulating qualities.

CONCLUSION

It should be understood that the foregoing disclosure relates to only a preferred embodiment of the invention and that numerous modifications or alterations may be made therein without departing from the spirit and scope of the invention as set forth in the appended claims. Having thus described the invention in what is claimed and desired to be secured by Letters Patent of the United States is:

1. In a hydrobarophone apparatus for measuring the ambient hydrostatic pressure by sensing changes in the interior air pressure of said apparatus equal to said hydrostatic pressure, the improvement comprising a glass fiber reinforced plastic temperature shield attached to and substantially surrounding said apparatus, said shield having an aperture therein for admitting pressures from the exterior of said shield to said apparatus, said shield having a low thermal conductivity and a low thermal coefficient of expansion;

said shield further having high shock resistance and being substantially impervious to water whereby said shield provides a heat sink to aid in maintaining said apparatus at a substantially constant temperature during measurement of ambient hydrostatic pressure.

2. The combination of claim 1 wherein said shield is a glass fabric reinforced plastic laminate.

3. The combination of claim 2 wherein said shield comprises a cylindrical casing having first and second lids mounted in sealing relation at both ends thereof, said apparatus being attached to said first lid and disposed within said casing.

4. The combination of claim 3 wherein said aperture within said shield is within said cylindrical casing, said first lid further including an opening therein for filling said shield prior to launching.

5. A temperature shield for a pressure sensing device disposed within a liquid medium comprising housing means attached to and entirely enclosing said device and a portion of said medium, said housing means consisting of a glass fabric reinforced plastic laminate having a low thermal conductivity and a low thermal coefficient of expansion, said reinforced plastic laminate having high shock resistance and being substantially impervious to water for providing a heat sink to aid in maintaining said device at a substantially constant temperature during measurement of ambient hydrostatic pressures, said housing means including means therein for admitting pressure changes into said shield whereby said portion of said medium remains at a pressure equal to the pressure of the surrounding liquid medium exterior to said shield while being substantially insulated against temperature changes of said liquid medium exterior to said shield.

6. In a pressure sensing device for measuring the ambient hydrostatic pressure by sensing changes in the interior air pressure of said device equal to said hydrostatic pressure, the improvement comprising
   a glass fiber reinforced plastic temperature shield attached to and substantially surrounding said device,
   said shield having an aperture therein for admitting pressures from the exterior of said shield to said device,
   said shield having a low thermal conductivity and a low thermal coefficient of expansion,
   said shield further having high shock resistance and being substantially impervious to water whereby said shield provides a heat sink to aid in maintaining said device at a substantially constant temperature during measurement of ambient hydrostatic pressure.

7. The combination of claim 6 wherein said glass fiber reinforced plastic temperature shield is a glass fabric reinforced plastic laminate.

References Cited by the Examiner
UNITED STATES PATENTS

| | | | |
|---|---|---|---|
| 2,592,159 | 4/52 | Klebba et al. | 73—300 |
| 3,094,874 | 6/63 | Rolle | 73—393 X |
| 3,120,759 | 2/64 | Pochapsky | 73—300 X |

RICHARD C. QUEISSER, *Primary Examiner.*